Figure 1:
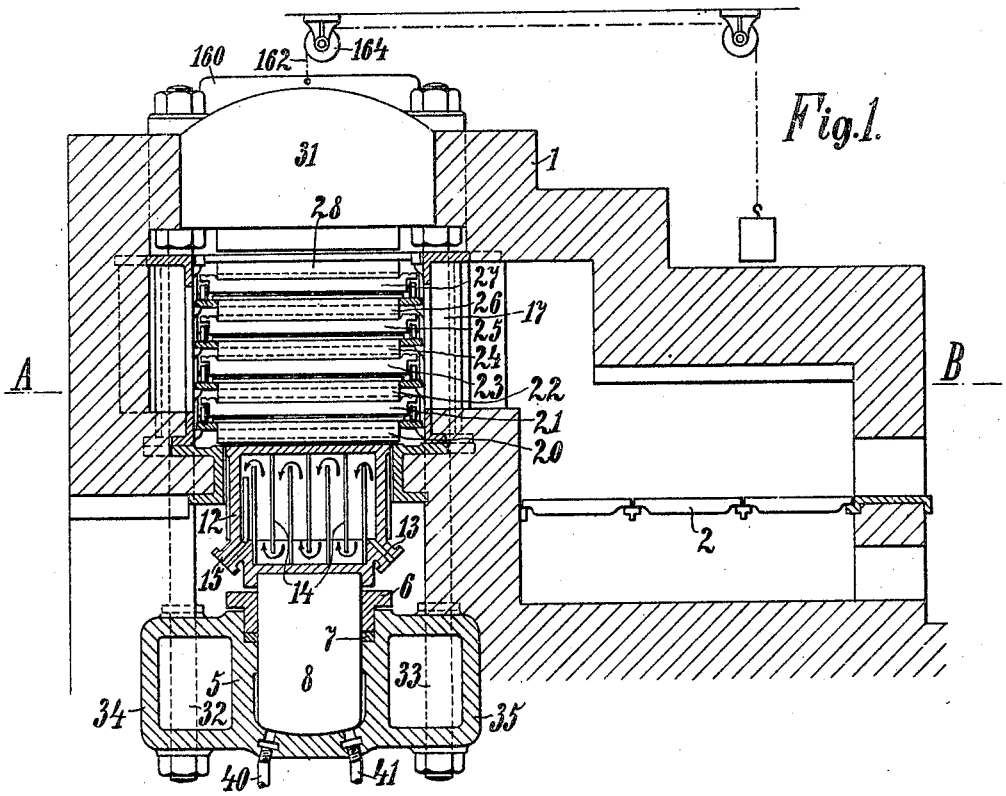

No. 804,239. PATENTED NOV. 14, 1905.
T. LEDERMÜLLER.
APPARATUS FOR CARBONIZING PEAT.
APPLICATION FILED OCT. 20, 1902.

8 SHEETS—SHEET 1.

Witnesses
J. M. Wynkoop
M. B. Hayes.

Inventor
Theodor Ledermuller
by attys.
Knight Bros.

No. 804,239. PATENTED NOV. 14, 1905.
T. LEDERMÜLLER.
APPARATUS FOR CARBONIZING PEAT.
APPLICATION FILED OCT. 20, 1902.

8 SHEETS—SHEET 2.

No. 804,239. PATENTED NOV. 14, 1905.
T. LEDERMÜLLER.
APPARATUS FOR CARBONIZING PEAT.
APPLICATION FILED OCT. 20, 1902.

8 SHEETS—SHEET 3.

Witnesses
Jno R Adair
Harold ?

Inventor
Theodor Ledermüller
By Knight Bros
attys

No. 804,239. PATENTED NOV. 14, 1905.
T. LEDERMÜLLER.
APPARATUS FOR CARBONIZING PEAT.
APPLICATION FILED OCT. 20, 1902.

8 SHEETS—SHEET 4.

Witnesses
Inventor
Theodor Ledermüller
By Knight Bros.
attys.

No. 804,239. PATENTED NOV. 14, 1905.
T. LEDERMÜLLER.
APPARATUS FOR CARBONIZING PEAT.
APPLICATION FILED OCT. 20, 1902.

8 SHEETS—SHEET 5.

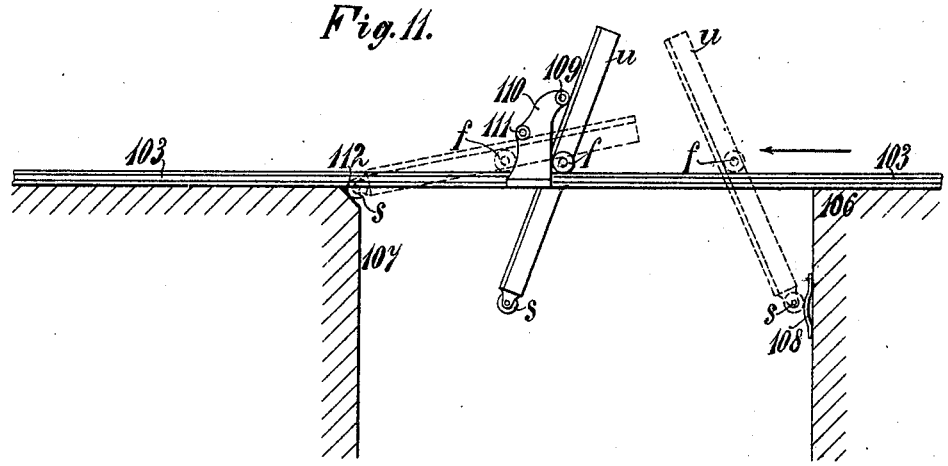
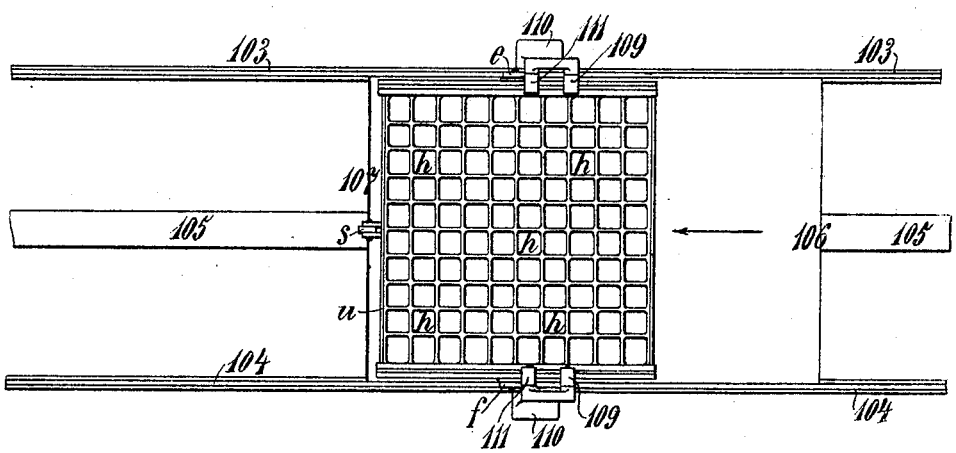

No. 804,239. PATENTED NOV. 14, 1905.
T. LEDERMÜLLER.
APPARATUS FOR CARBONIZING PEAT.
APPLICATION FILED OCT. 20, 1902.

8 SHEETS—SHEET 7.

Witnesses:
Jno R Adams
Harold Twis

Inventor
Theodor Ledermüller
By Knight Bro
attys.

No. 804,239. PATENTED NOV. 14, 1905.
T. LEDERMÜLLER.
APPARATUS FOR CARBONIZING PEAT.
APPLICATION FILED OCT. 20, 1902.
8 SHEETS—SHEET 8.
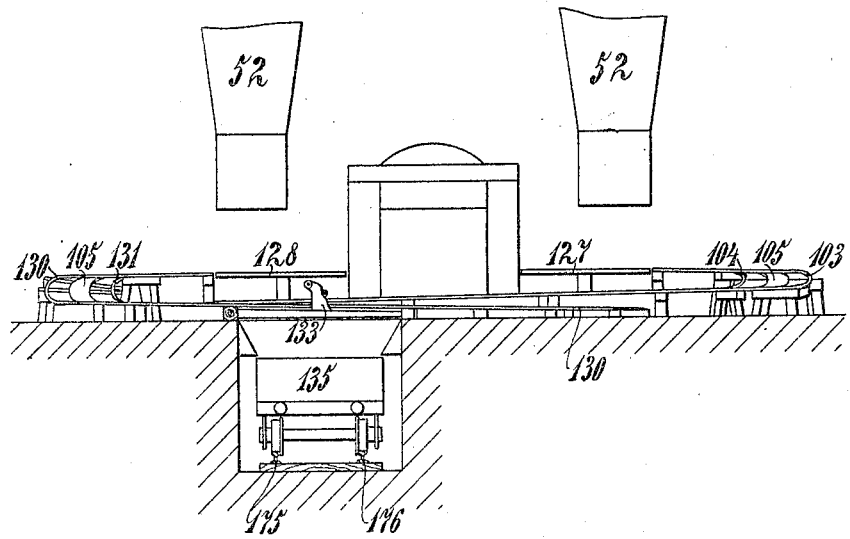
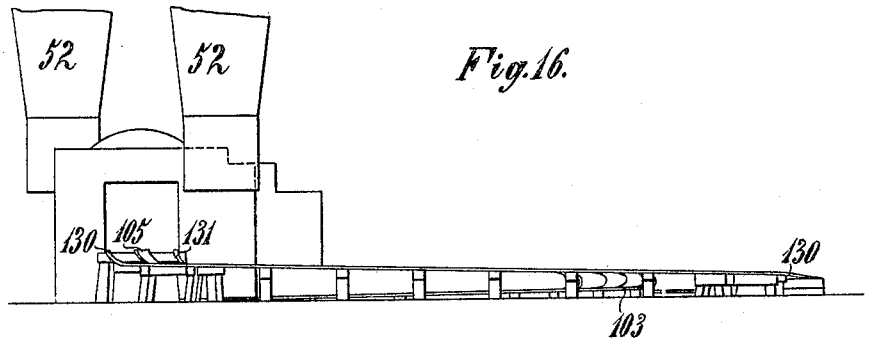

UNITED STATES PATENT OFFICE.

THEODOR LEDERMÜLLER, OF LEMBERG, AUSTRIA-HUNGARY.

APPARATUS FOR CARBONIZING PEAT.

No. 804,239.          Specification of Letters Patent.          Patented Nov. 14, 1905.

Application filed October 20, 1902. Serial No. 128,039.

*To all whom it may concern:*

Be it known that I, THEODOR LEDERMÜLLER, a subject of the Emperor of Austria-Hungary, and a resident of Lemberg, in the Crownland of Galicia, Empire of Austria-Hungary, have invented a certain new and useful Apparatus for Carbonizing Peat, of which the following is a specification.

As is known, previous to the drying process of the so-called "air-dried peat" it is for the purpose of carbonizing subjected to very great pressure between forming-plates and simultaneously subjected to the effects of very high temperature. The apparatus with which this carbonizing of peat has heretofore been carried out is subject to a number of objections and does not meet the conditions required in an economical conduct of the process in competition with the mineral-coal industry. The inefficiencies of the apparatus heretofore employed manifest themselves particularly in the slow work and the consequent increase of cost in the procedure, also in the preparation of press apparatus incident thereto, in the impossibility of maintaining the effective carbonizing temperature of 400° centigrade, and in the non-uniform carbonizing of the pressed peat.

The subject of the present invention is an apparatus which makes it possible to secure the desirable conditions above indicated in carbonizing peat, while avoiding the disadvantages suggested, also to insure the most rapid operation, together with an easy manipulation of the press apparatus through mechanical means to press the peat between the individual forming-plates in suitable molding-boxes under a very high temperature—over three hundred atmospheres—to maintain a constant temperature of 400° centigrade in the press-chamber, and thus to secure the uniform carbonizing of the interior of the peat, which would insure a complete series of steps in the manipulation of the peaty substance from its introduction into the apparatus to the discharge of the finished product.

A further important feature of the present invention consists in the fact that the openings for the supply of the material to be carbonized in the heating-chamber containing the press apparatus are provided with tracks for the peat or molding boxes extending up to frames destined for the reception of said forming-plates and molding-boxes. This arrangement renders it possible to pass the peat-boxes so rapidly over said tracks between the pressing plates or to remove them so rapidly from the oven after carbonization of the peat that the capacity of the apparatus will be increased considerably. The rapid transport of the molding-boxes between the pressing-plates provides the further advantage that the peat, contained in boxes loosely closed by means of a cover is not burned in consequence of the high temperature in the furnace, because the time during which the peat is exposed to the heat is too short to permit such burning.

The apparatus is illustrated in the accompanying drawings, in which—

Figure 2:
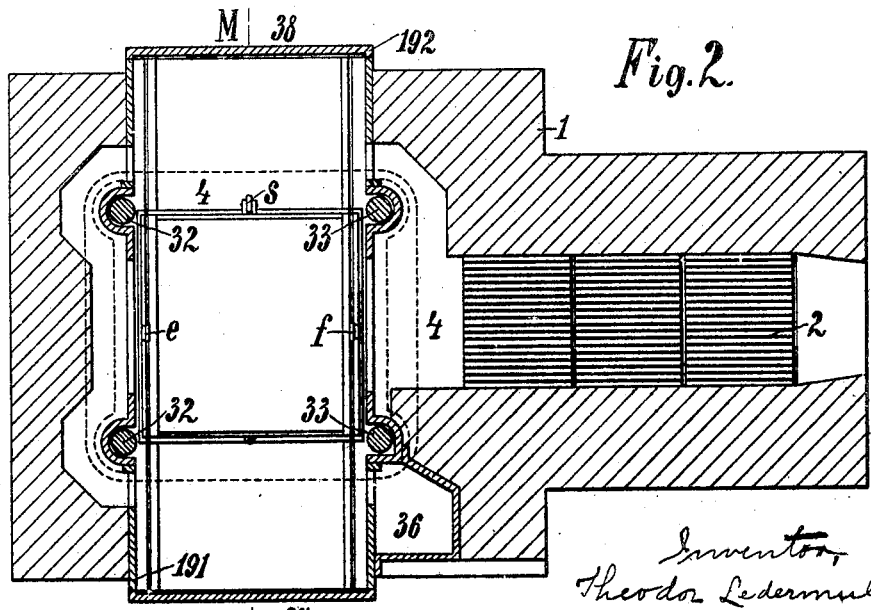
Figure 3:
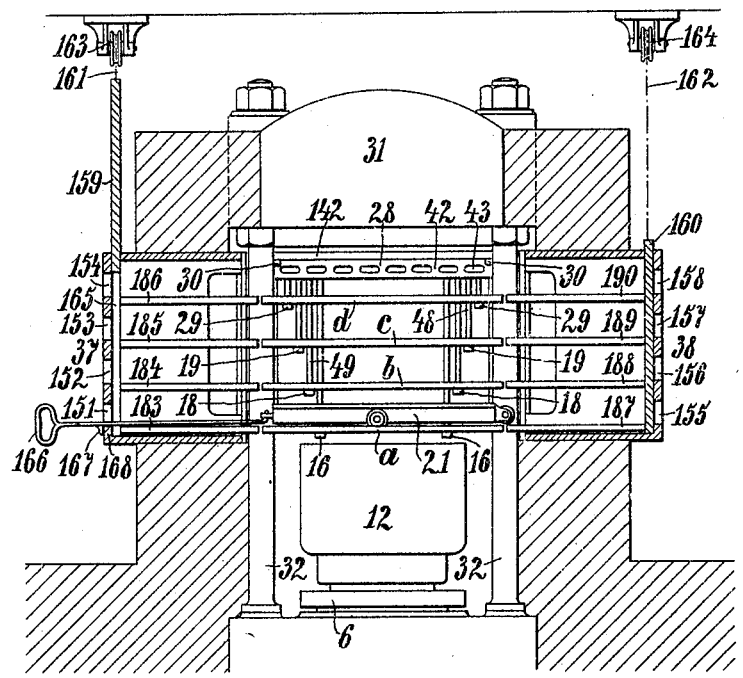
Figure 4:
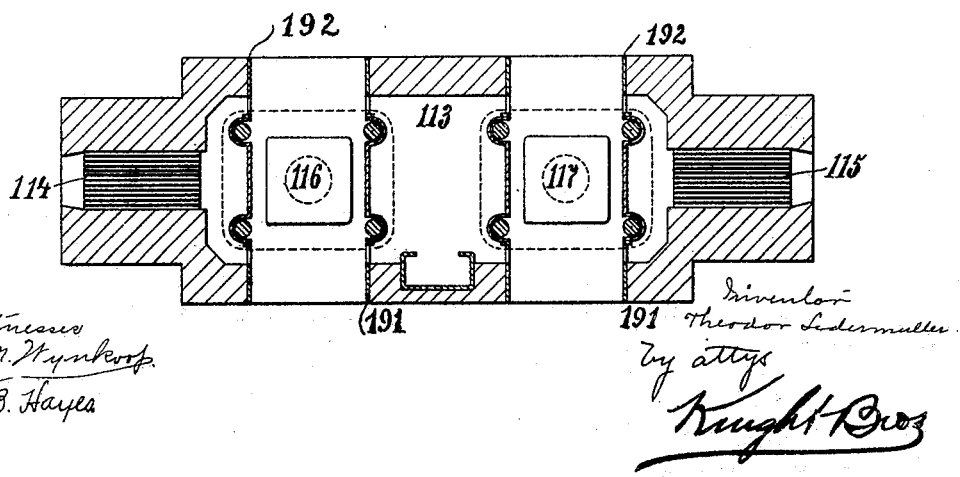
Figure 5:
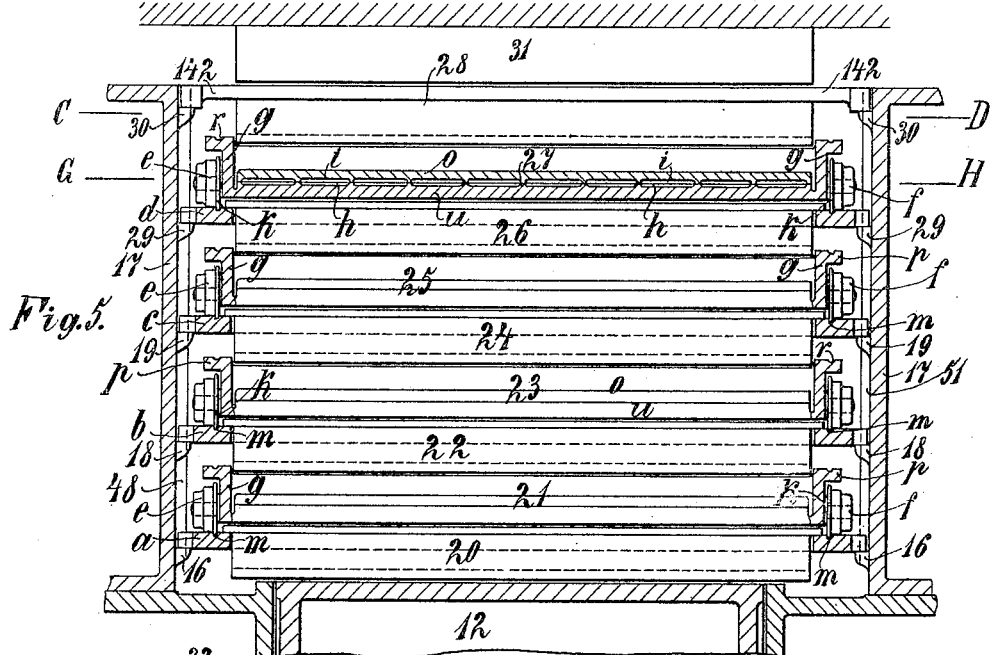
Figure 6:
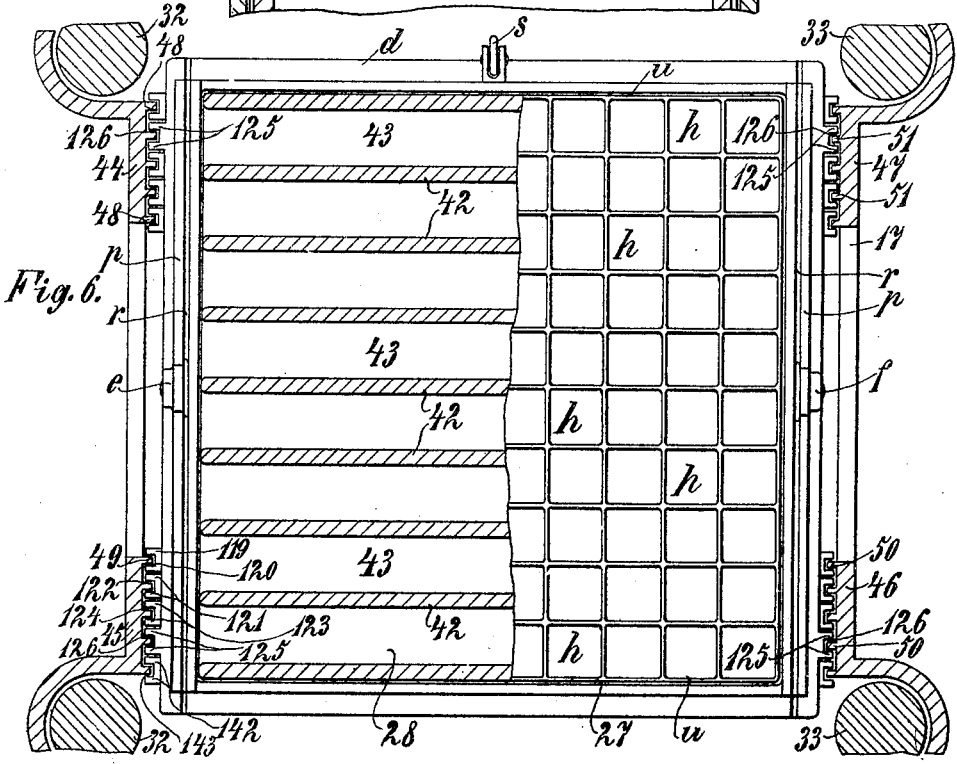
Figure 7:
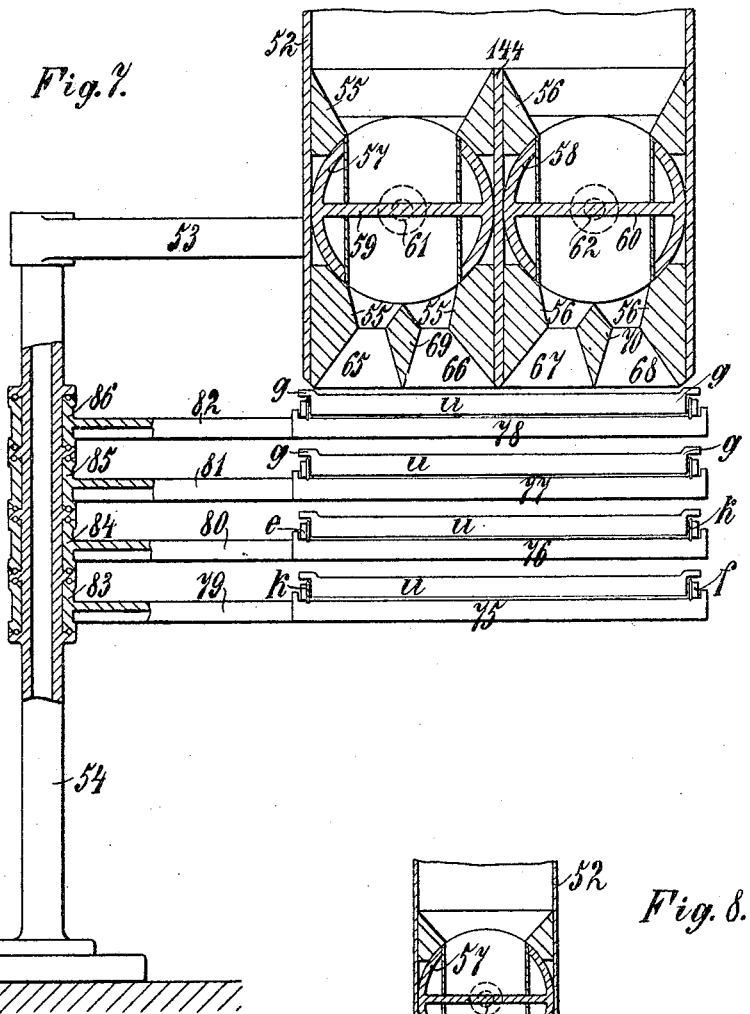
Figure 8:
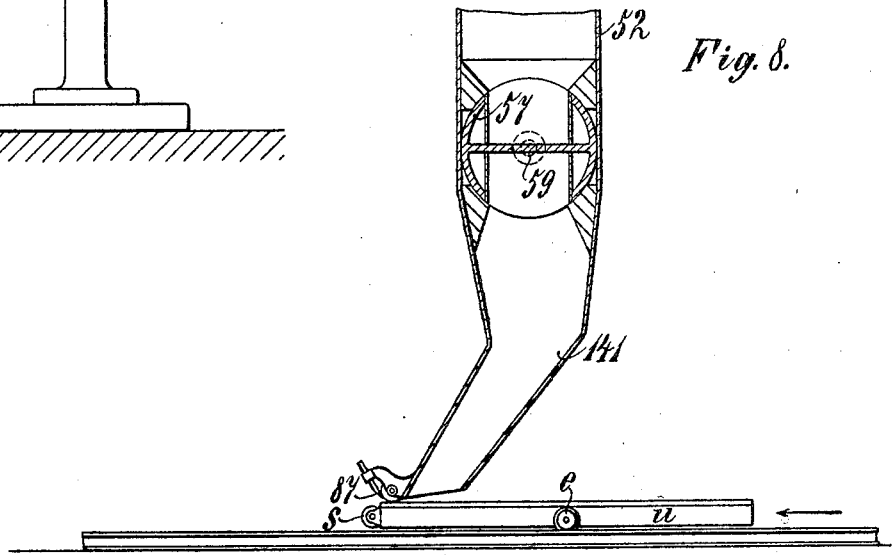
Figure 9:
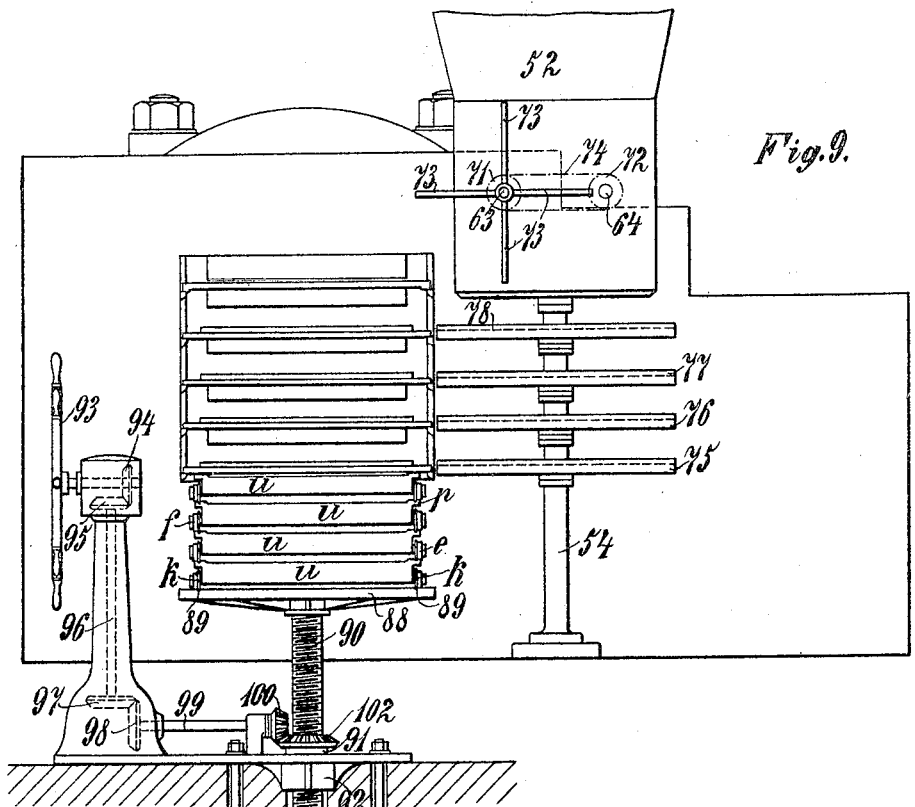
Figure 10:
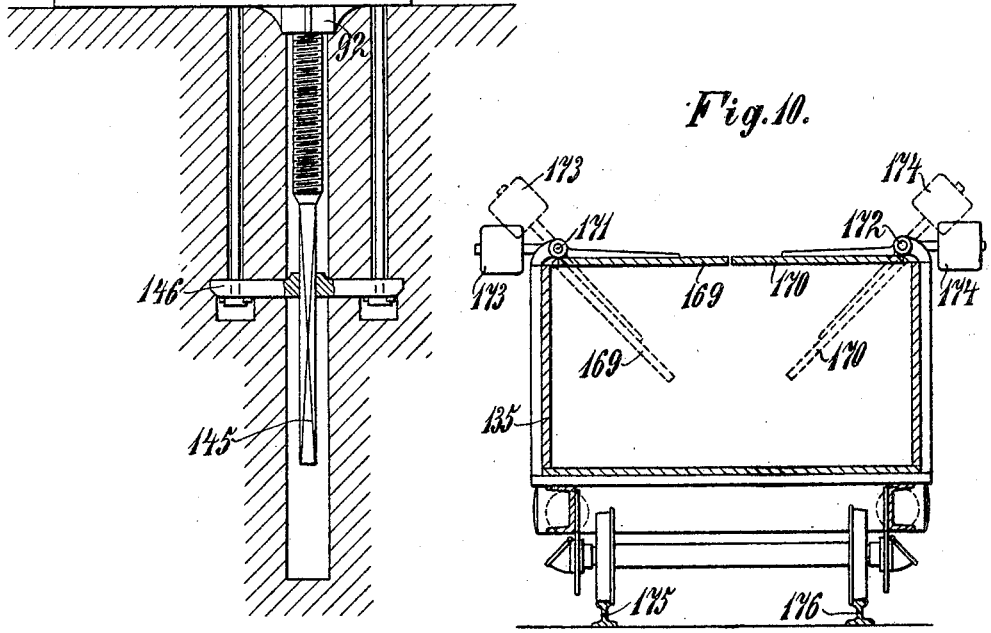
Figure 13:
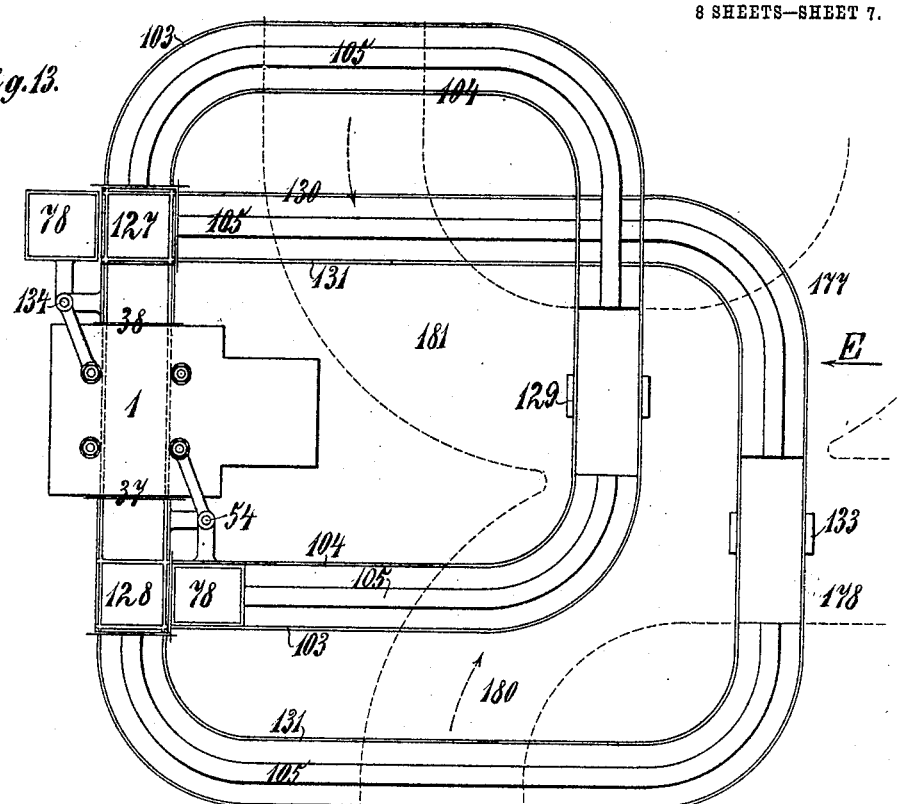
Figure 14:
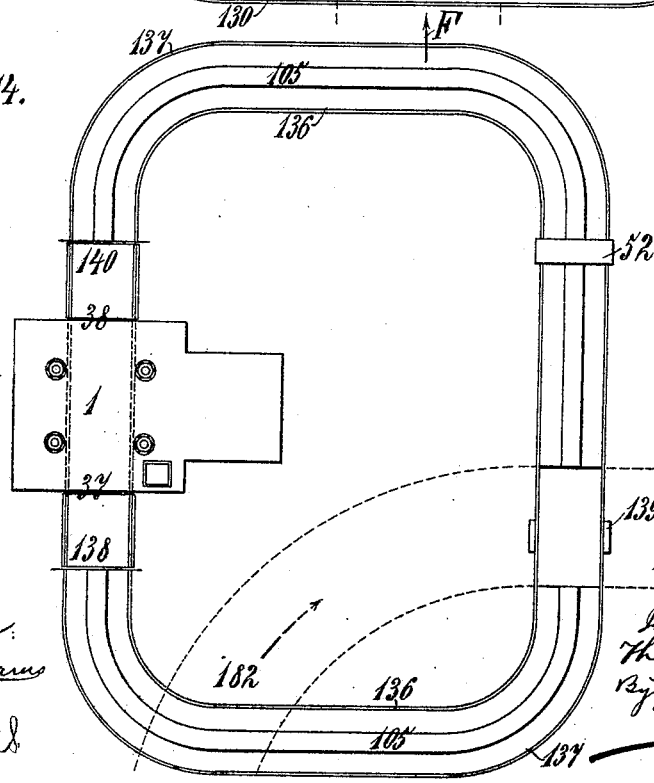

Figure 1 is a vertical section of the special press and heating apparatus. Fig. 2 is a horizontal section of the press and heating apparatus on the line *a b*, Fig. 1. Fig. 3 is a vertical section of the press and heating apparatus on the line *m n*, Fig. 2. Fig. 4 is a double arrangement of the apparatus with two oppositely-disposed ovens. Fig. 5 is a vertical section through the heating-chamber of the oven, on an enlarged scale, with a portion of the molding-boxes used for pressing the peat, also showing the tracks above referred to. Fig. 6 shows on the left-hand side a horizontal section of the heating-chamber through the press-plate and on the line *c d*, Fig. 5, and on the right-hand side shows a horizontal section through the heating-chamber on the line *g h*, disclosing the lower portions of the press-boxes with the upper portions removed. Fig. 7 shows, on an enlarged scale, a vertical section of an arrangement for filling the molding-boxes with a specific quantity of peat. Fig. 8 is a vertical section, likewise on an enlarged scale, showing another form of device for a similar purpose. Fig. 9 is a side elevation of the oven, corresponding to Fig. 1, with the feeding-opening and the arrangement for feeding the molding-boxes and the lift in front of the oven, through which the molding-boxes are elevated to the individual supports of the filling apparatus. Fig. 10 is a vertical section through the car into which the carbonized product drops upon the dumping of the molding-boxes. Fig. 11 is a vertical section through the pit which receives the car, together with a side view of the dumping apparatus for the molding-boxes, which run upon the rails thereof. Fig. 12 is a plan of the same. Fig. 13 is a plan of the entire apparatus, on a reduced scale, with conveying-tracks for the molding-boxes and showing the course traversed by the latter. Fig. 14 is a plan of the entire arrangement, likewise on a smaller scale, showing a somewhat modified or simplified arrangement upon which the circuit of the molding-boxes can likewise be traced. Fig. 15 is a view of the combined apparatus looking in the direction of the arrow *e*, Fig. 13; and Fig. 16 is a view of the combined apparatus looking in the direction of the arrow *f*, Fig. 13.

To facilitate an understanding of the novel parts of the apparatus, the following specification will be divided up into sections, successively describing the several features of the apparatus.

*The press and heating apparatus.*—As will be seen from Figs. 1 to 3, the heating apparatus consists of the oven 1 and a combustion-chamber 4, in which the pressing apparatus is erected in vertical position. The press apparatus consists of a pressure-cylinder 5, a piston 8, fitted to this cylinder by a gland 6 and packing 7, spacing-box 12 above the press-piston 8 to protect the said piston, with its packings, from the heat of the oven, and to effectively accomplish which purpose said box is suitably cooled by water entering the same at 13 and circulating around the deflector-walls 14 and escaping at 15, as indicated by the arrows, and frames *a b c d*, located above the spacing-box 12 (see Fig. 3 especially) and supported upon ledges 16 18 29 30 in the heating-chamber, in which frames the corresponding press-plates 20 22 24 26 are hung, with the exception of the uppermost press-plates 28, provided with no frame, but rests directly upon the ledges 30. Upon each frame *a b c d* is slid the corresponding molding-box 21, 23, 25, or 27. The press-head 31 is connected in the usual manner by spring-bolts 32 33 with the parts 34 35 of the press-cylinder 5.

The products of combustion passing from the grate 2 envelop the molding-boxes 21 23 25 27, as also the press-plates 20 22 24 26 28, and escape thence into the flue 36. The temperature of 400° centigrade can be maintained in the heating-chamber 17 by employing any suitable automatic arrangement for controlling the draft below the grate, so as to reduce the temperature in the event that the heat becomes too great or increase the temperature under opposite conditions. This method of regulating the temperature in the heating-chamber 17 will be assisted by the capacity of the press-plates 20 22 24 26 28, to be hereinafter somewhat more fully explained, to store up heat to a certain extent.

The operation of the pressing and regulating apparatus is as follows: As soon as the press is loaded with the molding-boxes 21 23 25 27, either from the side 37 or from the side 38, Fig. 2, the controlling-lever is shifted so as to open communication between said reservoir and the pressure-cylinder 5, so that the fluid-pressure from said reservoir may enter said cylinder 5 through the pipe 40. Now follows the specific pressure of over three hundred atmospheres, by which the air-dried peat between the upper and lower portions of the molding-boxes is reduced to one-fifth of its volume and while the parts of the molding-boxes move together until their edges touch. During this procedure, which lasts about six minutes, a heavy production of gas takes place in consequence of the carbonizing of the peat. In order that the carbonic-acid gas thus produced may escape from the molding-boxes, these molding-boxes are ventilated four times in such a manner that upon manipulating the controlling-lever the pressure-fluid may be diminished. In consequence of this the gas-pressure within the molding-boxes will temporarily separate the parts of the molding-boxes to a slight degree, so that the gas produced by the carbonizing process can escape into the surrounding space or into the heating-chamber 17.

It is advisable not to permit the carbonic-acid gas and other vapors to escape from this pressure-chamber to mix with the product of combustion from the grate, since in this manner the products of combustion will be only partly utilized. It is better to withdraw these gases from the heating-chamber and to employ them either for warming the heating-oven or for drying the peat.

After the lifting of the press has taken place four times, as already explained, the carbonizing of the peat is complete. Communication between the press-cylinder 5 and the accumulator is therefore cut off, and the fluid is drawn off from the press through the tube 41, so that the press-cylinder descends. The molding-boxes are now withdrawn and conducted to the dumping or discharging apparatus farther down.

During the carbonizing process which takes place in the heating-chamber 17 the openings 151 152 153 154 and 155 156 157 158, Fig. 3, must naturally be held closed. This may be suitably accomplished by slides 159 160, mounted upon chains 161 162, passing over rollers 163 164, and counterbalanced by weights. In order that the slides may hermetically close the heating-chamber against external influences, the slides are mounted in grooves in the walls of the heating-chamber—as, for example, as shown in Fig. 3, in which a groove is shown at 165.

Obviously instead of a single slide or sliding door 159 160 several such doors could be employed, one for each individual opening 151 to 158, which by suitable connections between them could be manipulated simultaneously to open and close them. In such an arrangement the doors collectively would be balanced by suitable counterweights and guided in appropriate grooves in the walls of the heating-chamber, so that a certain pressure on a lever provided on the doors for transmitting motion thereto would serve to simultaneously open all the doors and also to close them and effect a perfectly tight closure.

The introduction of the molding-boxes into the press apparatus or heating-chamber 17 is effected through the medium of the iron hooks 166, which are illustrated in Fig. 3. A shoulder 167 is formed on these hooks, which limits their movement into the heating-chamber in introducing the molding-boxes with sufficient exactness by the engagement of said shoulder against the face 168 of the heating-chamber. In this manner it is possible to adjust the positions of the molding-boxes exactly beneath the press-plate frames, so that the middle points of the molding-boxes will lie immediately beneath the middle points of the press-plates 20 22 24 26 28. It is obvious that several such heating-ovens could be constructed together in case the capacity of the apparatus required or made this necessary. It is advisable in such case to arrange the ovens in pairs, as shown in Fig. 4. In this arrangement the fire-boxes of the two ovens are in a certain sense combined in one.

The fire-gases from the grates 114 115, Fig. 4, which circulate among the presses 116 117, reach the common flue 118 after a certain amount of heat radiation. In the space between the two press apparatus 116 117 a certain character of heat regeneration takes place which reacts on the molding-plates of the press, whereas in a simple oven, Fig. 1, the heating of the parts lying nearest the grate is a little more effective than those parts of the molding-plates lying distant therefrom. As this ununiformity in the heating is for the most part obliterated by the regeneration which takes place between the two press apparatus, it follows that in the double-oven type illustrated in Fig. 4 the greatest uniformity of carbonization takes place.

If it is desired to employ four ovens, they should be arranged two and two after the manner of Fig. 4, when the same uniformity of effect as above described will be accomplished.

*Mounting and arranging the press-plates in the heating-chamber with the molding-boxes located between them.*—As has been heretofore suggested, but as will be seen more clearly from Figs. 5 and 6, the press-plates 20 22 24 26 are suspended in the frames $a$ $b$ $c$ $d$ in a manner to permit their being lifted out of said frames. The frames are in turn mounted in the walls of the heating-chamber upon the ledges 16 16 or 18 18, 19 19, 29 29. As has also previously been intimated, the uppermost press-plate 28 rests directly upon the ledges 30 of the heating-chamber.

In order to fix the position of the press-plate frames $a$ $b$ $c$ $d$, as also the uppermost press-plate 28 in the heating-chamber, the latter is provided at the two side parts opposite one another and arranged vertically in respect to the longitudinal direction of the oven at 44 45 46 47 with guiding-beads 48 48 48, 49 49 49, 50 50 50, 51 51 51, Figs. 3 and 6. One of each of these four groups of guiding-beads just enumerated engages in a corresponding group of recesses of the molding-box frames $a$ $b$ $c$ $d$ or in the flange 142 of the press-plate 28. These recesses, of which each press-plate frame has four, are, according to purpose, provided in special laps, in which the press-plates run out. For example, the frame $d$ of the press-plate 26 has four laps 125 in the slits 126, of which one each of the beads 48 49 50 51 engages. Each of these engaging beads is provided with a lug 29, Fig. 3, upon which the laps 125, Fig. 6, find their corresponding abutments.

The frames $a$ $b$ $c$, like the frame $d$ of the press-plate 26, as also the press-plate 28, run each in four laps 119 121 123 142, in whose slits 120 122 124 143 another of the groups of guiding-beads 48 49 50 51 always engages. In order that the introduction of the press-plate frames into the heating-chamber will not be hindered, the lugs 16 18 19 29 30, upon which the press-plate frames $a$ $b$ $c$ $d$ or the uppermost press-plate 28 rest with their laps, are step-formed, one beneath the other, Fig. 3, so that each individual press-plate frame can pass by the lugs provided for the other press-plate frames.

The press-plates are constructed in the form of frames and provided with intermediate ribs 42 42 42, so that a row of channels 43 43 43 is provided on each press-plate. Inasmuch as the heating-gases coming from the fire-grate will be compelled to separate themselves in these channels, which may be covered with another material of a specially-large heating capacity, an essential portion of the heat will be retained or stored up in the press-plates.

The two frames 191 192, Fig. 2, are respectively arranged in the openings provided in the heating-chamber for the supply of the material and carry the tracks 183 184 185 186 and 187 188 189 190, respectively. These tracks extend to the frames $a$ $b$ $c$ $d$ and are arranged at the same height as the latter. Therefore when the slide 159 or 169 is lifted the peat or molding boxes may be shoved onto the tracks 183 184 185 186 or 187 188 189 190 and then passed from here to the respective frame $a$ $b$ $c$ $d$ between the pressing-plates, as to be seen in Fig. 3, by the peat-box 21.

The molding-boxes 21 23 25 27 consist each of an under part $u$ and an upper part $o$. Both halves of the molding-box contain, as will be seen, for example, in the mold-box 27, Fig. 5, corresponding depressions $h$ $i$, the form and size of which correspond to the dimensions of the briquets to be produced. The lower half of the mold-box $u$ is formed in one piece with the frame $g$ and is provided with wheels $e$ $f$. The latter engage with their flanges $k$ in the track-like grooves $m$ of the press-plate frames a b c d, so that the mold-boxes upon entering the heating-chamber will be directed upon the form-plate in a certain unchangeable direction.

The flange-like extensions p of the frames g are in like manner provided with track-like grooves r for the flanges k in order to permit the different frames outside of the heating-chamber to be placed directly one above another or to secure the proper relative position of said parts. It is obvious that instead of the grooves elevated rails serving as tracks for the rails e f could be employed.

*Arrangement for filling the mold-boxes with peat.*—The mold-boxes above described are to be filled with pieces of peat of the size of nuts or smaller up to the rim of the frames g. For this purpose the air-dried peat must be suitably broken up in the usual reducing-machine—such, for instance, as a pair of oppositely-working toothed rollers. The pieces of peat thus reduced to nut size then reach the filling apparatus, Figs. 7 and 9, in order to be delivered thereby to the mold-boxes. As shown in Fig. 7, the filling apparatus consists of a vertical hopper 52 of square or rectangular section, mounted by the arm 53 on the column 54. The hopper 52 is divided by a wall 144 into two compartments, each of which is provided with an incline 55 or 56. In the inclines 55 and 56 are mounted drums 57 and 58, tightly fitting, but rotatable, which drums are divided each into two parts by diametrical walls 59 or 60. These dividing-walls are provided with horizontal trunnions, which are mounted in the side walls of the hopper 52, as shown by dotted lines in Fig. 7.

If now the hopper 52 above the division-walls 59 60 is filled with nut-size peat, upon turning the drums 57 and 58 through an angle of one hundred and eighty degrees a measured quantity of peat, depending upon the dimension of the drum, will be discharged downwardly through the openings 65 66 or 67 68 into the under portions of the mold-boxes located thereunder, and the latter will be filled, as heretofore explained, up to their upper edges. For a better distribution of the peat the inclines 55 56 are provided with transverse rails 69 70. In order to rotate both drums simultaneously, a chain-wheel 71 is mounted on the trunnion 63, which upon turning said trunnion through the medium of the hand-wheel 73 transmits motion through the chain 74 to the chain-wheel 72 on the trunnion 64. It is self-evident that this movement from one drum to the other could be accomplished by other equivalent means. In order to transfer the under portion of the mold-boxes from beneath the filling mechanism with ease to the oven, and vice versa, holding-tables 75 76 77 78 are provided.

Like the press-plates a b c d, Fig. 5, and the flanges p of the frames g, Fig. 5, the upper faces of the tables 75 76 77 78 are provided with track-like depressions for the flanges k of the wheels f in order to define the position of the mold-boxes on the tables. The tables are provided with arms 79 to 82, which are mounted to swing through the medium of their bearings 83 84 85 86 on the column 54. It thereby becomes possible to swing those molding-boxes that have become filled from the filling apparatus to the corresponding press-plate frame in the heating-chamber and after the upper portion o of the mold-box is placed thereon to shove the box into the heating-chamber. In order to reduce friction as much as possible during the swinging movement, it is desirable to use ball-bearings in mounting the swinging arms 79 to 82 on the column 54, as illustrated in Fig. 7.

The modified form of filling apparatus illustrated in Fig. 8 differs from that already described only in that the hopper 52 has arranged within it only one rotatable drum with its dividing-wall 59; also in that the hopper 52 is provided with a downwardly-inclined delivery-spout. The under part u of the mold-box, running on rails shoved in the direction of the arrow beneath the spout 141, will be filled in mass with the peat, whereupon the peat will be evenly distributed in the mold-box by a roller 87, rotatably mounted on the end of the discharge-spout, which effects a smoothing of the peat in the box. In this arrangement the swinging tables are dispensed with and the charged boxes are forwarded on the rails to the press apparatus or elevated by a lift thereto. Consequently, as stated above, it is possible to feed the press after lifting the slide 159 or 160 from the side 37 or 38. For this purpose the peat-boxes are placed on the tracks 183 184 185 186 or 187 188 189 190 and moved from here onto the frames a b c d between the pressing-plates. Then the slide 159 or 160 is lowered and the press actuated. After the carbonization of the peat has taken place the peat-boxes with the briquets are removed at the opposite side—*i. e.*, at 191 192. For this purpose they are placed on the tracks a b c d and from here, as stated below, transferred to the discharge-place. After the boxes 21 with the finished briquets have left the oven the press may, as indicated above, be refed with fresh boxes from the opposite side.

*Arrangement of the lift for forwarding the boxes from the oven to the rails or to the swinging plates of the filling apparatus, and vice versa.*—In order to bring the mold-boxes from the heating-chamber to the tracks after completion of the carbonization, upon which tracks the boxes travel to the dumping apparatus, and, further, to shift the emptied boxes to the swinging tables 75 to 78 of the filling apparatus, Fig. 7, or to lift the boxes leaving the filling apparatus on the appropriate press-plate frame in the heating-chamber, lifts are employed, such as the lift shown at 88, Fig. 9.

These are plates which, through appropriate mechanical means, can be raised or lowered and are provided on their upper surfaces with track-grooves 89 89 for the reception of the wheel-flanges $k\ k$. The raising and lowering of the lift can be effected by hydraulic means by providing the lift with a downwardly-extending piston which works in a cylinder with suitable packings in a well-known manner and actuated by fluid-pressure. In the present instance the lift is actuated, as shown in Fig. 9, by screw-gear—as, for example, by a spindle 90, whose nut 91 is mounted to turn in the plate 92. The screw-spindle 90 has an extension 145, of square or rectangular section, which has a corresponding guide in the guide-plate 146. This permits the spindle to move axially, but prevents it from turning. The operation of the lift or the rotation of the nut 91 proceeds from the controlling-wheel 93, which transmits its movement through the bevel-gears 94 95, shaft 96, bevel-gears 97 98, shaft 99, and the bevel-wheel 100 to the bevel-wheel 102, which is fixedly connected with the nut 91.

In the present case (illustrated in Fig. 9) if the lift is to be employed to shift the lower mold-box halves successively onto the swinging tables the lift with the box-half is elevated until the flange $p$ of the second highest box $u$ intersects the table 75, and then the uppermost box $u$ is shifted upon the swinging table 75. The controlling-wheel 93 is then further turned until the lift continues upward sufficiently to permit the second box $u$ to be shifted onto the swinging table 76, and so on.

*The track extension for directing the mold-boxes to enable the latter to travel in circuit.*—The track extension for directing the mold-boxes to the dumping apparatus, to be described hereinafter, and for returning them to the press consists of the rails 103 104, Figs. 12 and 13, upon which the wheels $e\ f$ of the under mold-box halves run. Between the two track-rails at the same elevation therewith is a forward-running roller-path 105, serving as a track for a third wheel or roller $s$, Fig. 8, on the lower box member. It should be noted that this lower mold-box member is somewhat overbalanced on the side toward the third roller, so that said box member, whether full or empty, will never tip toward the side opposite to that on which the roller is mounted. The track-rails, as well as the intermediate roller-path 105, have the necessary fall or inclination, so that the box members $u$, after they have left the press and are brought to the track by the lift, travel by gravitation to the dump and then, after being emptied, continue on from the dump to the other lift in order that they may either be lifted, as previously explained, to the swinging tables of the filling apparatus, Fig. 7, or, when using the filling apparatus according to Fig. 8, pass directly upon the appropriate press-plate frame in the heating-chamber. In this manner a complete working circuit is executed by the box members and the operation of the carbonizing apparatus is essentially quickened and rendered more economical.

*The dumping apparatus for discharging the mold-boxes filled with the carbonized product.*—The dumping apparatus (shown in Figs. 11 and 12) serves to tip up the lower box members, which travel on the tracks 103 104, after the upper member has been removed from them, so that the briquets contained in said lower box members during the preceding carbonizing process will be caused to fall from the recesses $h$ and drop into a car standing below to receive them. (See Fig. 15.) For this purpose the roller-path 105 is broken away between the points 106 107, so that between these points the roller $s$ no longer finds support, the box by its overbalance turns on its axles in the wheels $e\ f$, and the end carrying the roller $s$ drops. The effect of this is a downwardly-swinging movement, resulting from the momentum exerting itself downward, bringing the box member momentarily to the position shown in dotted lines in Fig. 11, in which position the briquets will readily fall out of the box into the car standing below. The discharge of the briquets can be facilitated by permitting the box during its swinging movement to strike against a buffer 108, whereby the dislodgment of any briquets that may have stuck in the pockets will be insured. The emptied box immediately swings partly upward and starting to continue its way over the rails 103 104 in the position shown in full lines in Fig. 11 trips against the rollers 109 111 on the arms 110 110 near the track-rails. The box will be restored approximately to normal position by the rollers 109 and by the rollers 111 fully returned to such position, during which the roller $s$ mounts the incline 112 until it reaches the roller-path 105, Fig. 12, after which the emptied box member arrives at the second lift.

The car 135, (shown in vertical section in Fig. 10,) which, as already explained, serves to receive the briquets, is provided with a two-part inclosing cover, the respective parts 169 170 of which are hinged at 171 172 to the sides of the car, so as to swing downwardly as the briquets fall from the mold-boxes upon them, and having counterweights 173 174 to return them to closed position.

The cars are suitably mounted upon tracks 175 176, Figs. 10 and 15, moved through channels 180 181, Fig. 13, or 182, Fig. 14, beneath the dumping apparatus 129 133 139, and after being suitably filled the car is moved off and then suitably conducted through a long passage 177 or 178, Fig. 13, or 179, Fig. 14, through which passage a current of cold air is driven. In this manner it becomes possible to very readily cool off the briquets to a temperature of 50° centigrade—that is to say, to such a temperature as will prevent them from burning.

*The general arrangement of the peat-carbonizing apparatus.*—Although the general arrangement of the peat-carbonizing apparatus has already been described above with some particularity and is undoubtedly understood, it is well to add a few general remarks concerning the system as a whole.

As will be seen from Fig. 13, both the lifts 127 and 128 are arranged adjacent to the oven 1 with their rectangular lifting-plates. Through the medium of the lift 127 the mold-boxes are transferred to the track 103 104 after completion of the carbonizing process, pass to the tipping apparatus 129, and from thence after they have emptied pass upon the lift 128, by which they are lifted to the swinging tables 75 to 78 of the filling apparatus, Fig. 7. After they are suitably filled and provided with their upper parts they are forwarded to the heating-chamber by simply swinging the tables around the column 54, being delivered onto the press-plate frames.

While the mold-boxes in the plan described are traveling that portion of their course outside of the oven—that is to say, while the carbonized product is being discharged and the boxes are being filled with fresh peat—the heating-chamber has been filled with other mold-boxes, which after the lapse of about six minutes are withdrawn at 37 and delivered by the lift 128 upon the track 130 131 and will pass to the dumping apparatus 133, at which point all briquets discharged from the mold-boxes drop into the car 135, Fig. 15. From the dumping apparatus 133 the molding-boxes pass to the lift 127, are conducted thence by the swinging tables 75 78 of the second filling apparatus, constructed in accordance with Fig. 7, there filled with peat, and by the turning of the swinging tables about the columns 54 and 134 to the side 38 are delivered into the heating-chamber between the press-plates.

According to the above description, therefore, the heating-chamber is charged with new mold-boxes alternately from the sides 37 and 38, while the mold-boxes with the finished product are discharged from the heating-chamber alternately from the sides 38 and 37.

The general arrangement illustrated in Fig. 14 is simplified in comparison with that shown in Figs. 13, 15, and 16 in that only one track 136 137 is necessary. In this arrangement the mold-boxes with the finished product are withdrawn from the oven only on the side 37, then to the lift 138, are lifted by the latter upon the tracks 136 137, and then moved to the dumping apparatus 139. After they are there discharged they reach the filling apparatus 52, constructed in accordance with Fig. 8, are successively filled, and then forwarded by the lift 140, by which they are delivered to the side 38 of the heating-chamber between the press-plate frames.

Having thus described the invention, the following is what I claim as new therein:

1. In an apparatus for carbonizing peat, the combination with a heating-oven, of a press adapted to contain the peat and mounted in the oven in a position to be exposed to the gases from the fireplace of the oven, a series of press-plates arranged in said press and adapted to receive molding-boxes between them and means permitting the introduction of molding-boxes between said press-plates without their traversing the fireplace of the oven.

2. In an apparatus for carbonizing peat, the combination with a heating-oven, of a press adapted to contain the peat and mounted in the heating-chamber of the oven, a series of press-plates arranged in said press and adapted to receive molding-boxes between them and means permitting the introduction of molding-boxes between said press-plates without their traversing the fireplace of the oven.

3. In an apparatus for carbonizing peat, the combination with a heating-oven of masonry, of a press adapted to contain the peat and mounted in the oven in a position to be exposed to the gases from the fireplace of the oven, a series of press-plates arranged in said press and adapted to receive molding-boxes between them, of suitable openings provided in the longitudinal sides of the masonry for introducing said molding-boxes between said press-plates.

4. In an apparatus for carbonizing peat, the combination with a heating-oven, of a press adapted to contain the peat, press-frames located in said oven, press-plates mounted on said frames, mold-boxes provided between said frames, of suitable openings provided in the wall of the heating-chamber containing said press, and tracks extending up to said frames arranged in said openings for the reception of said molding-boxes.

5. In an apparatus for carbonizing peat, the combination with a heating-oven, of a press adapted to contain the peat, press-frames located in said oven, press-plates mounted on said frames, mold-boxes provided between said frames, of suitable openings provided in the wall of the heating-chamber containing said press, and tracks extending up to and coinciding with said frames arranged in said openings for the reception of said molding-boxes.

6. In an apparatus for carbonizing peat by subjecting it simultaneously to heat and pressure, the combination of the double heating apparatus containing two sets of means for confining the peat under pressure, a common heating-chamber for said apparatus, and independent hydraulic presses, coöperating with said peat-confining means, to subject the peat to pressure, as set forth.

7. In an apparatus for carbonizing peat by subjecting it simultaneously to heat and pressure, the combination of the heating apparatus, a hydraulic press provided therein, means within the heating apparatus for containing the peat under pressure, and a spacing-box between said peat-containing means and the hydraulic press, for protecting the latter from heat, substantially as explained.

8. In an apparatus for carbonizing peat by subjecting it simultaneously to heat and pressure, the combination of a heating-chamber, means therein for containing peat under pressure, a hydraulic press within the heating apparatus, a spacing-box between the peat-containing means and said hydraulic press, and means for circulating water through said spacing-box.

The foregoing specification signed at Chemnitz this 1st day of October, 1902.

THEODOR LEDERMÜLLER.

In presence of—
  BERNHARD BLANK,
  WILHELM ANDERS.